US012601405B2

(12) United States Patent
Leger

(10) Patent No.: US 12,601,405 B2
(45) Date of Patent: Apr. 14, 2026

(54) ROTARY BEARING MAINTENANCE INDICATION

(71) Applicant: Fisher Controls International LLC, Marshalltown, IA (US)

(72) Inventor: Bryan Quinn Leger, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/756,276

(22) Filed: Jun. 27, 2024

(65) Prior Publication Data

US 2026/0002592 A1 Jan. 1, 2026

(51) Int. Cl.
| | |
|---|---|
| *F16K 1/22* | (2006.01) |
| *F16C 17/24* | (2006.01) |
| *F16C 17/26* | (2006.01) |
| *F16C 41/00* | (2006.01) |

(52) U.S. Cl.
CPC ............ *F16K 1/224* (2013.01); *F16C 17/246* (2013.01); *F16C 17/26* (2013.01); *F16C 41/00* (2013.01); *F16C 2237/00* (2013.01)

(58) Field of Classification Search
CPC ...... F16K 1/224; F16C 41/00; F16C 2237/00; F16C 17/00; F16C 17/022; F16C 17/20; F16C 17/246; F16C 17/26
See application file for complete search history.

(56) References Cited

U.S. PATENT DOCUMENTS

| | | | |
|---|---|---|---|
| 4,148,271 | A | 4/1979 | Majernik |
| 4,175,331 | A | 11/1979 | Johnson |
| 4,626,121 | A | 12/1986 | Tajima et al. |
| 4,658,643 | A | 4/1987 | Nakayama et al. |
| 5,451,110 | A | 9/1995 | Gams, Jr. et al. |
| 5,796,349 | A | 8/1998 | Klein |
| 6,119,504 | A | 9/2000 | Claus |
| 10,968,957 | B2 | 4/2021 | Turmeau et al. |
| 11,788,982 | B2 | 10/2023 | Haschke et al. |
| 2013/0299243 | A1* | 11/2013 | von Gynz-Rekowski ................... F16C 17/10 175/57 |
| 2014/0190394 | A1 | 7/2014 | Lovett |

(Continued)

FOREIGN PATENT DOCUMENTS

GB 2177762 A 1/1987

*Primary Examiner* — Kelsey E Cary
(74) *Attorney, Agent, or Firm* — Hanley, Flight & Zimmerman, LLC

(57) ABSTRACT

Systems, apparatus, articles of manufacture, and methods for rotary bearing maintenance are disclosed. An example apparatus includes a valve body defining a fluid passageway; a flow control member in the fluid passageway; a drive shaft coupled to the flow control member, the drive shaft extending through a shaft bore defined in the valve body; and a bearing around at least a portion of the drive shaft. The bearing includes: a first layer including a first material having a first coefficient of friction with the drive shaft when the first material is in contact with the drive shaft; and a second layer including a second material having a second coefficient of friction with the drive shaft when the second material is in contact with the drive shaft, the second coefficient of friction greater than the first coefficient of friction.

19 Claims, 9 Drawing Sheets

(56)           References Cited

U.S. PATENT DOCUMENTS

| | | | |
|---|---|---|---|
| 2015/0267656 A1* | 9/2015 | Hasegawa ............... | F02D 9/108 |
| | | | 123/184.59 |
| 2015/0362011 A1* | 12/2015 | Bell ........................ | F16C 41/00 |
| | | | 384/264 |
| 2020/0003256 A1* | 1/2020 | Koroyasu ............. | F16C 19/546 |
| 2023/0323954 A1* | 10/2023 | Matsushita ............. | F16K 1/224 |
| | | | 251/305 |

* cited by examiner

100

104

102    110

106

114

112

A
115

108

116

118

A

ROTARY BEARING MAINTENANCE INDICATION

FIELD OF THE DISCLOSURE

This disclosure relates generally to rotary valves and, more particularly, to rotary bearing maintenance indication.

BACKGROUND

Control valves are commonly distributed throughout process control systems to control the flow of various fluids (e.g., liquids, gases, etc.). Control valves can vary in size and operating conditions (e.g., operating pressures, operating temperatures, operating fluids, etc.). Control valves are often operated by movement of a shaft or stem that extends through a channel in the valve body. Bearings are used to reduce friction and smooth rotation of the shaft.

SUMMARY

Systems, apparatus, articles of manufacture, and methods for rotary bearing maintenance are disclosed. An example apparatus includes a valve body defining a fluid passageway; a flow control member in the fluid passageway; a drive shaft coupled to the flow control member, the drive shaft extending through a shaft bore defined in the valve body; and a bearing around at least a portion of the drive shaft. The bearing includes: a first layer including a first material having a first coefficient of friction with the drive shaft when the first material is in contact with the drive shaft; and a second layer including a second material having a second coefficient of friction with the drive shaft when the second material is in contact with the drive shaft, the second coefficient of friction greater than the first coefficient of friction.

An example bearing for a drive shaft in a valve is disclosed. The bearing includes: a first layer including a first material having a first coefficient of friction with the drive shaft when the first material is in contact with the drive shaft; and a second layer including a second material having a second coefficient of friction with the drive shaft when the second material is in contact with the drive shaft, the second coefficient of friction greater than the first coefficient of friction.

Figure 1A:
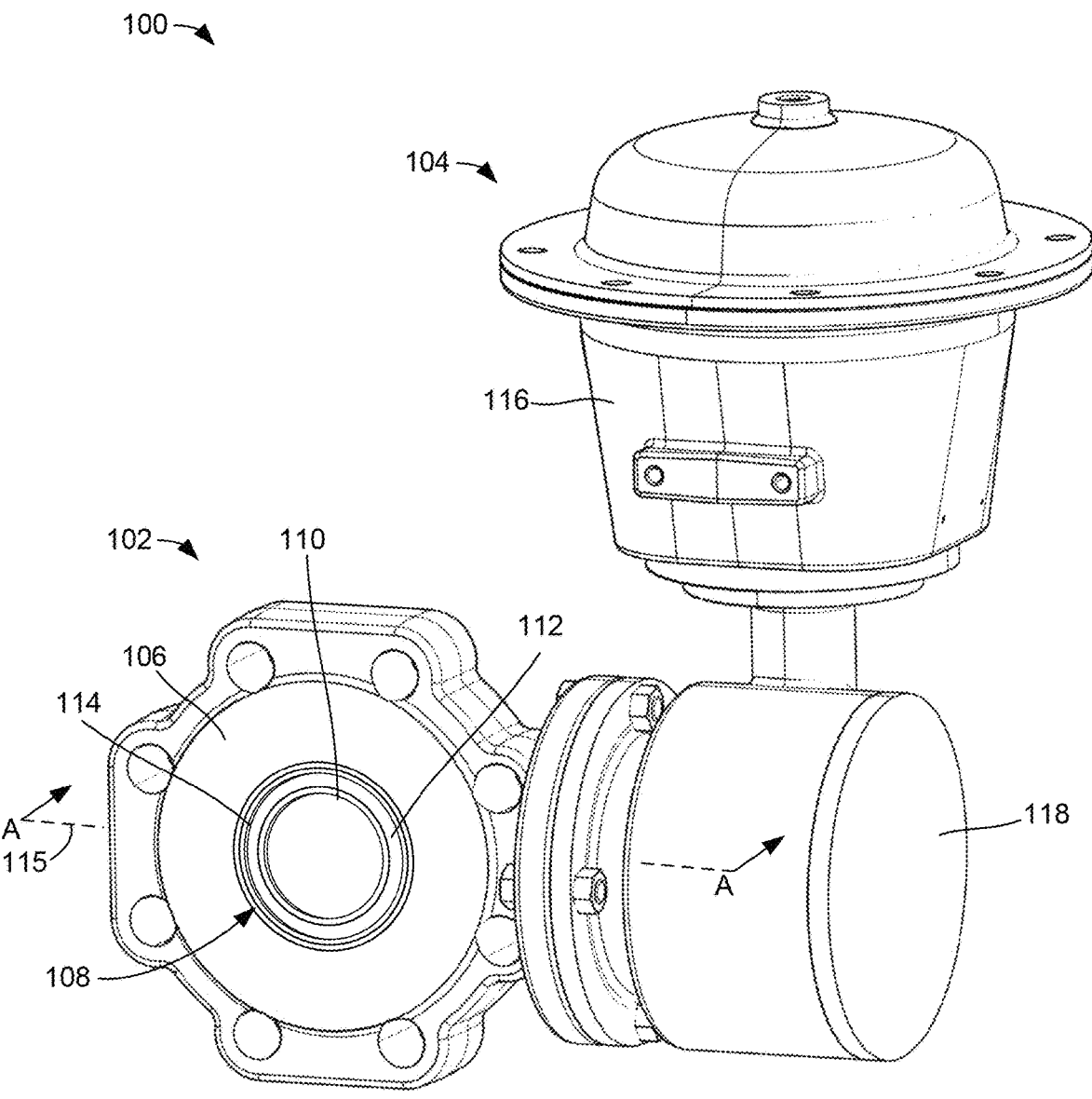
FIG. 1A illustrates an example control valve system including an example rotary valve in a closed position.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Rotary valves, such as butterfly valves and ball valves, are a common type of valve used in process control systems. A rotary valve typically includes a valve body that defines a fluid passageway and a flow control member that is rotatable in the fluid passageway to allow or block fluid flow. The flow control member is rotated by a drive shaft that extends through a channel or bore defined the valve body. The rotary valve includes one or more bearings to support and facilitate rotation of the drive shaft.

Over time the bearings become worn. Worn bearings can cause damage if there is metal to metal contact between components having tight clearances. In addition, worn bearings can affect the position of the drive shaft, which can affect control over the flow control member. Valves are taken offline to replace bearings, which incurs production costs.

Disclosed herein are example bearings that include wear indication features that can be detected to determine a wear state or condition of the bearings. Maintenance, repair, and/or replacement of worn bearings can be predicted and scheduled. Predictive or prognostic bearing maintenance minimizes valve downtime, minimizes production costs, minimizes the likelihood of damage to the valve, and increases valve performance.

FIG. 1A illustrates an example control valve system 100, constructed in accordance with the teachings of this disclosure. The control valve system 100 includes an example rotary valve 102 and an example actuator 104 for operating (e.g., opening or closing) the rotary valve 102. The example control valve system 100 may also be referred to as a control valve assembly or actuator valve assembly.

Figure 1B:
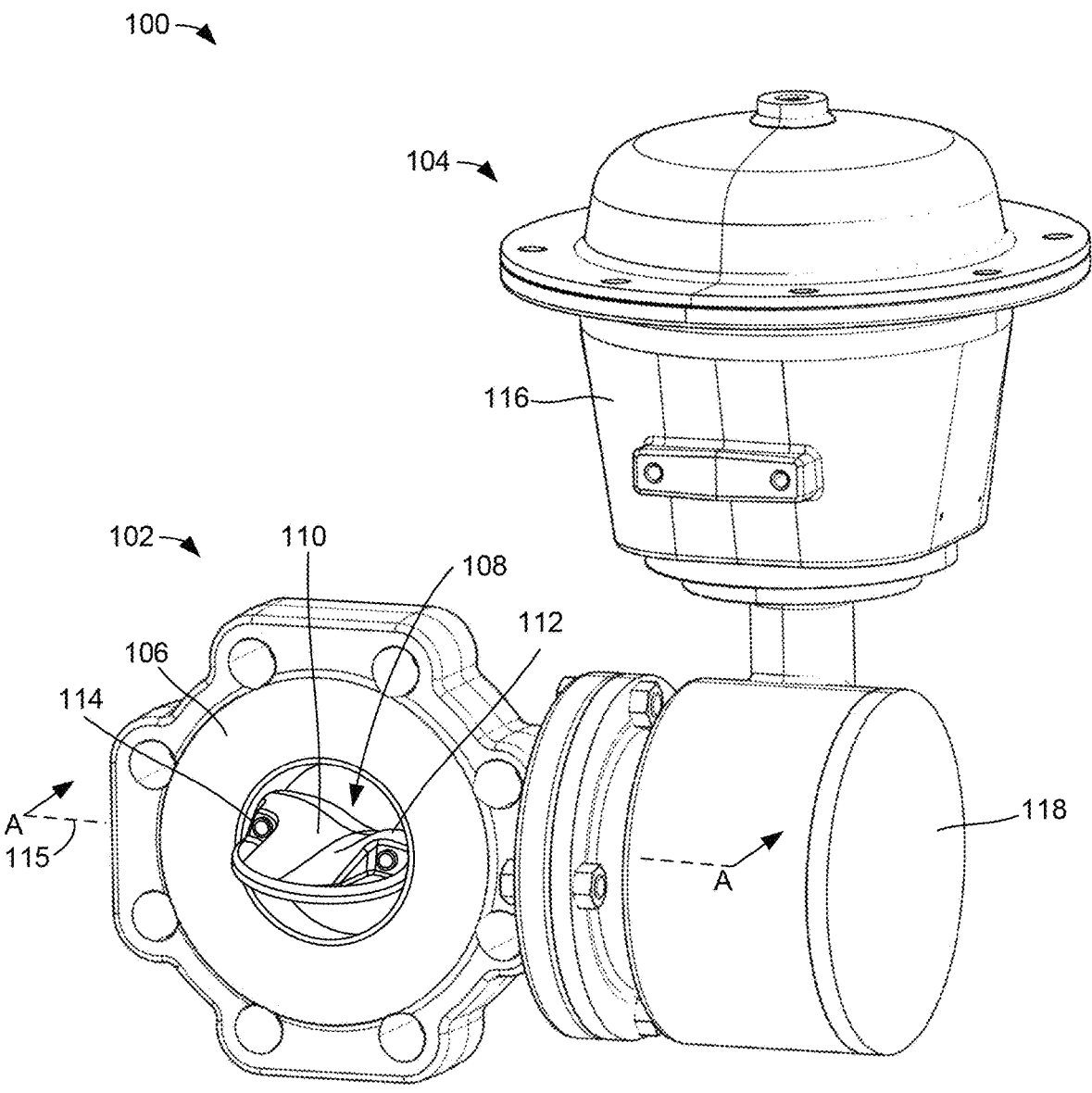
FIG. 1B illustrates the control valve system of FIG. 1A with the rotary valve in an open position.

In the illustrated example, the rotary valve 102 includes a valve body 106 defining a fluid passageway 108 and a flow control member 110 disposed in the fluid passageway 108 of the valve body 106. The valve body 106 can be coupled between upstream and downstream pipes to control the flow of a fluid between the pipes. The flow control member 110 is rotatable in the fluid passageway 108 between a closed position, which is shown in FIG. 1A, and an open position, which is shown in FIG. 1B. In this example, the flow control member 110 is implemented as a disc. However, in other examples, the flow control member 110 can be implemented by another type of rotatable flow control member such as a ball. In the closed position, as shown in FIG. 1A, the flow control member 110 blocks the fluid passageway 108, thereby preventing fluid flow between the pipes. The flow control member 110 can be rotated to the open position, as shown in FIG. 1B, in which the flow control member 110 is at least partially angled relative to the valve body 106, which allows fluid to flow through the fluid passageway 108 and, thus, between the pipes.

The rotary valve 102 includes a drive shaft 112 and a follower shaft 114 that are coupled to the flow control member 110. The drive shaft 112 and the follower shaft 114 are rotatable about a rotational axis 115. The drive shaft 112 can be rotated about the rotational axis 115 to rotate the flow control member 110 between the open and closed positions. The follower shaft 114 rotates based on rotation of the drive shaft 112. In some examples, the flow control member 110 is rotatable about 90° between the fully closed position, shown in FIG. 1, and a fully open position in which the flow control member 110 is substantially parallel to the fluid passageway 108. The flow control member 110 can also be rotated to any position or angle between the fully closed position and the fully open position to allow partial fluid flow.

In this example, the actuator 104 is a linear actuator. The actuator 104 includes a rod that is moved linearly (e.g., up-and-down in the orientation shown in FIGS. 1A and 1B) to control the rotary valve 102. The actuator 104 has an actuator casing 116 that houses a diaphragm and other components for moving the rod. The control valve system 100 has a linkage that converts linear motion of the rod to rotary motion of the drive shaft 112.

In the illustrated example, the control valve system 100 includes an example mounting housing 118 that is coupled between the rotary valve 102 and the actuator 104. In particular, the mounting housing 118 is coupled to the valve body 106 and to the actuator casing 116. As such, in this example, the mounting housing 118 couples the rotary valve 102 and the actuator 104. In some examples the mounting housing 118 is a sealed housing or chamber. In some examples, the mounting housing 118 is constructed of metal, such as aluminum or stainless steel.

Figure 2:
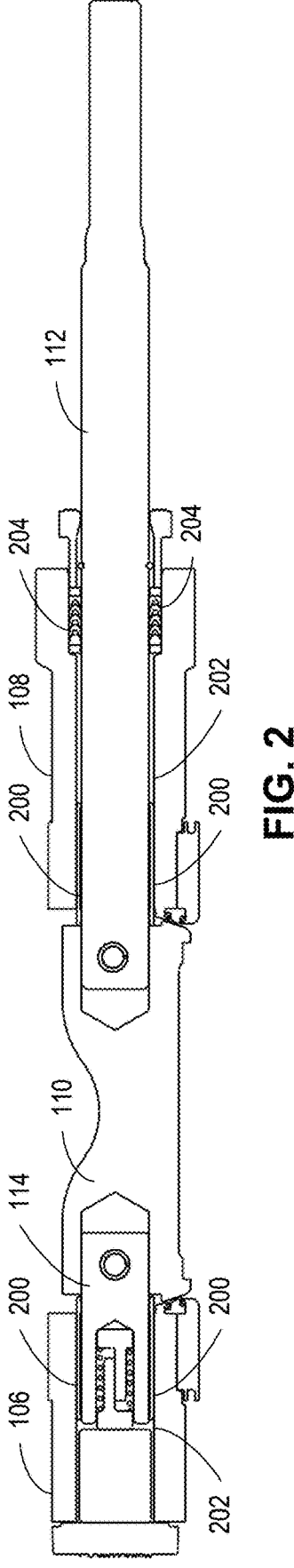
FIG. 2 is a partial cross-sectional view of the control valve system taken along the A-A line of FIG. 1A.

FIG. 2 is a partial cross-sectional view of the control valve system 100 taken along the A-A line of FIG. 1A. Example bearings 200 surround a portion of each of the drive shaft 112 and the follower shaft 114. The drive shaft 112, follower shaft 114, and bearings 200 are positioned within a shaft bore 202 of the valve body 106.

In the illustrated example the bearings 200 are rotary bearings that hold or support the drive shaft 112 and the follower shaft 114, which are rotating components. The bearings 200 may be referred to as, for example, a plain bearing, a journal bearing, a friction bearing, rotary bearing, etc. In some examples, lubrication is used to reduce friction between the drive shaft 112 and the follower shaft 114 and the bearing 200. In examples disclosed herein, the bearings 200 include a multi-layer structure that is used as a wear indicator. In some examples, the bearings 200 include a first layer and a second layer. The first layer includes a first material and the second layer includes a second material different than the first material. In some examples, the first layer contacts the drive shaft 112, and the first layer eventually wears after use of the valve system 100. Eventually, the second layer is exposed and the second layer contacts the drive shaft 112. Contact between the second layer and the drive shaft 112 is indicative of a worn bearing. Examples disclosed herein referring to the drive shaft 112 can also apply to the follower shaft 114.

The example of FIG. 2 also includes a packing 204 that is positioned around the drive shaft 112. In some examples, the packing 204 includes a set of rings such as o-rings of a resilient material. The packing 204 is positioned between the drive shaft 112 and the valve body 106. The packing 204 forms a seal to prevent process fluid from leaking from the control valve system 100.

Figure 3A:
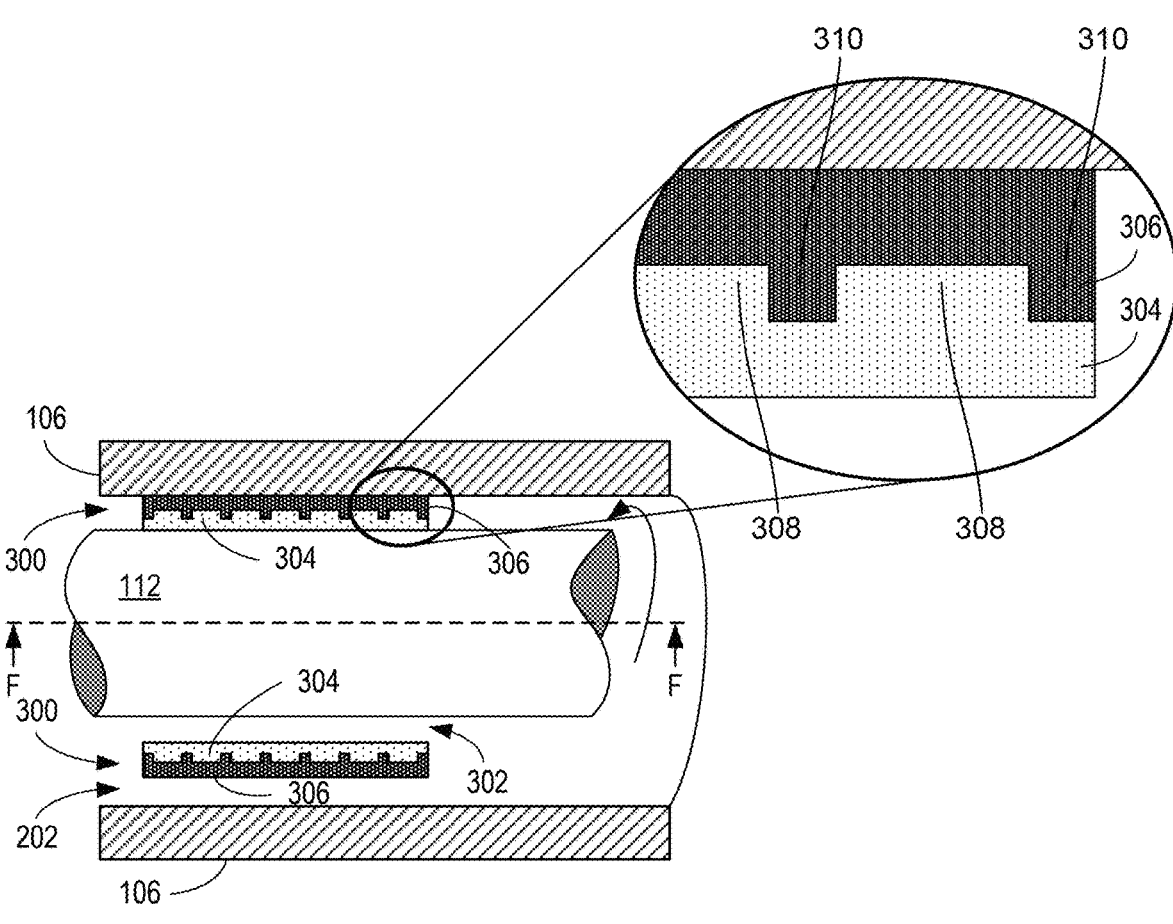
FIG. 3A is a side view of an example rotary bearing including an example bearing wear indicator in a first wear state.

FIG. 3A is a side view of an example rotary bearing 300 that includes wear indication functionality. The bearing 300 at least partially surrounds the drive shaft 112. In the example of FIG. 3A, the drive shaft 112 is loaded by a force, F, such that the drive shaft 112 is in contact with an inner diameter of the bearing 300 in the position at the top of the bearing 300 (e.g., at the top of the diagram). The inner diameter of the bearing 300 is spaced from the drive shaft 112 at the bottom of the bearing 300 (e.g., toward the bottom of the diagram) as indicated by the space 302. The bearing 300 itself is pressed against the valve body 106 at the top, which leaves a gap in the bore 202 between the bottom of the bearing 300 and the valve body 106.

The bearing 300 includes a first example layer 304 and a second example layer 306. In the illustrated example, the first layer 304 is at an inner diameter of the bearing 300 and the second layer 306 is at an outer diameter of the bearing 300. In some examples, the first layer 304 includes a first material, and the second layer 306 includes a second material. In some examples, the first material and the second material are different. In some examples, the first material includes a polymer. In some examples, the first material includes polyether ether ketone (PEEK), polytetrafluoroethylene (PTFE), other thermoplastics, and/or a combination of materials. In some examples, the second material includes metal.

In the illustrated the example, the first layer 304 and the second layer 306 are mechanically interlocked via finger joints. In some examples, the first layer 304 and the second layer 306 include a plurality of protrusions, fingers, teeth, or tabs and cavities or recesses such that tabs 308 of the first layer 304 are joined adjacent to tabs 310 of the second layer 306. The example of FIG. 3A shows rectangularly shaped tabs 308, 310 forming tongue-and-groove joints. In other examples, the tabs 308, 310 and corresponding recesses form dovetailed joints, puzzle-shaped joints, lap joints, dowel joints, etc. In some examples, the first layer 304 and the second layer 306 are coupled in a lattice work where the layers transition from a polymer at the inner portion of the bearing 300 to a metal at the outer portion of the bearing 300. In some examples, the tabs 310 of the second layer 306 maintain portions of the first layer 304 that cold flow under the load of the drive shaft 112.

The first layer 304 is a lower friction material than the second layer 306. In addition, the first layer 304 is the primary wear surface against which the drive shaft 112 operates. Over time, the bearing 300 wears and the thickness of the first layer 304 changes from a first thickness to a second thickness, which is less than the first thickness. In other words, the first layer 304 wears away over periods of use of the bearing 300. Eventually, the first layer 304 wears away to the point that the drive shaft 300 makes contact with

Figure 3B:
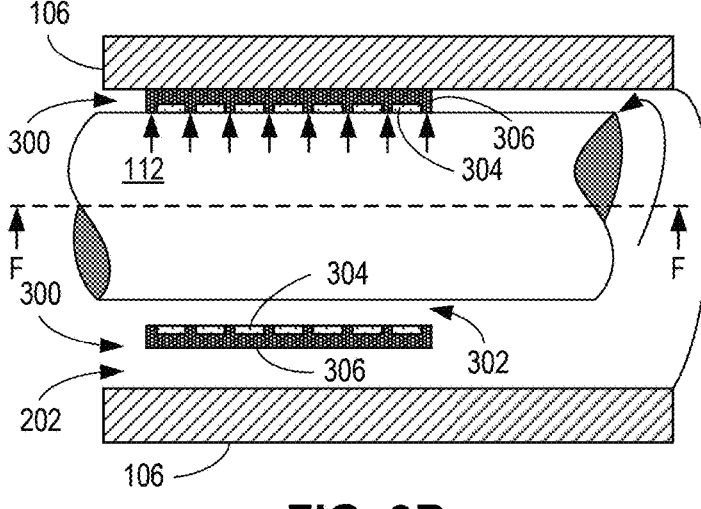
FIG. 3B is a side of the rotary bearing of FIG. 3A with the bearing wear indicator in a second wear state.

5 the second layer 306 (FIG. 3B). When the first layer 304 has worn away to the point that the drive shaft 112 contacts the second layer 306, there is an increase in friction between the drive shaft 112 and the bearing 300. The increased friction results in a larger torque generated as the drive shaft 112 rotates against the second layer 306 as compared to the first layer 304. There is a first coefficient of friction between the drive shaft 112, which may include a metal, and the first layer 304, which includes a polymer. There is a second coefficient of friction between the drive shaft 112, which may include a metal, and the second layer 306, which includes a metal. The first coefficient of friction is lower than the second coefficient of friction. Thus, more torque is needed when the drive shaft 112 rotates as the bearing 300 wears.

Figure 6:
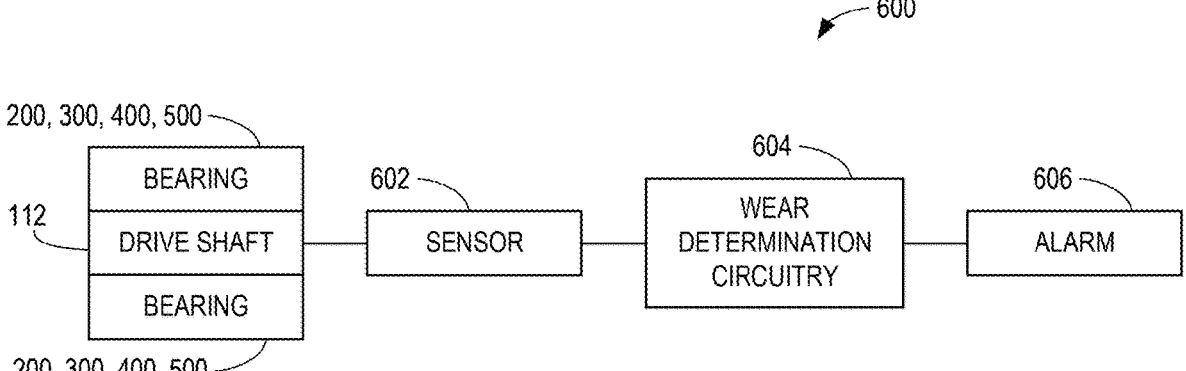
FIG. 6 is a block diagram of an example implementation of a bearing wear indication system.

The increase in torque during rotation of the drive shaft 112 can be detected by a sensor. For example, FIG. 6 is a block diagram of an example implementation of a bearing wear indication system 600. The bearing wear indication system 600 includes an example sensor 602 and example wear determination circuitry 604. In some examples, the sensor 602 include a torque sensor, a strain gauge, a rotational strain sensor, and/or other type of sensor that can measure and/or scan parameters related to the functioning of the drive shaft 112 and/or bearing 300. The wear determination circuitry 604 compares the wear parameter measured by the sensor 602 to a reference or threshold value. For example, in the example of FIGS. 3A and 3B, the wear determination circuitry 604 compares the torque measured by the sensor 602 during rotation of the drive shaft 112 with a threshold value. If the torque value meets, exceeds, or otherwise satisfies the threshold value (e.g., the measured torque is greater than the threshold value), the wear determination circuitry 604 diagnoses or determines that the bearing 300 has worn and needs maintenance, repair, and/or replacement. In other words, the wear determination circuitry 604 monitors the torque profile and assess a wear point or wear state of the bearing 300 based on the torque profile. A change in torque is indicative of a change in the first layer 304 from the first thickness to the thinner second thickness, where portions of the first layer 304 have worn away.

In some examples, the wear determination circuitry 604 compares the parameters measures by the sensor 602 over time. For example, the wear determination circuitry 604 compares parameters (e.g., torque) at different points in time to determine an amount of change between two points of time. In some examples, a step change and/or a change in torque of a threshold amount of difference may be indicative of a wear state of the bearing 300.

In some examples, the wear determination circuitry 604 compares parameters at different points in time to determine a rate of change in the measured parameter (e.g., torque). The rate of change can be used to indicate a wear state or predict a wear state of the bearing 300. A predicted wear state can be used to schedule maintenance in advance of a worn condition or failure of the bearing 300.

In some examples, the wear determination circuitry 604 triggers or causes actuation of a notification, a warning, or an alarm 606. In some examples, the alarm 606 includes a sound, a light, a report, a text, and/or other display indicative of the wear of the bearing 300.

As shown in FIG. 3B, when the first layer 304 has worn enough to enable the second layer 306 to contact the drive shaft 112, there remains portions of the first layer 304 in contact with the drive shaft. Thus, the lower coefficient of friction between the first layer 304 and the drive shaft 112 continues to provide some lubricity to the system. The drive shaft 112 continues to rotate against the bearing 300 without damage, but the increase in torque based on the higher coefficient of friction between the second layer 306 and the drive shaft 112 indicates that the bearing 300 needs maintenance.

Figure 4A:
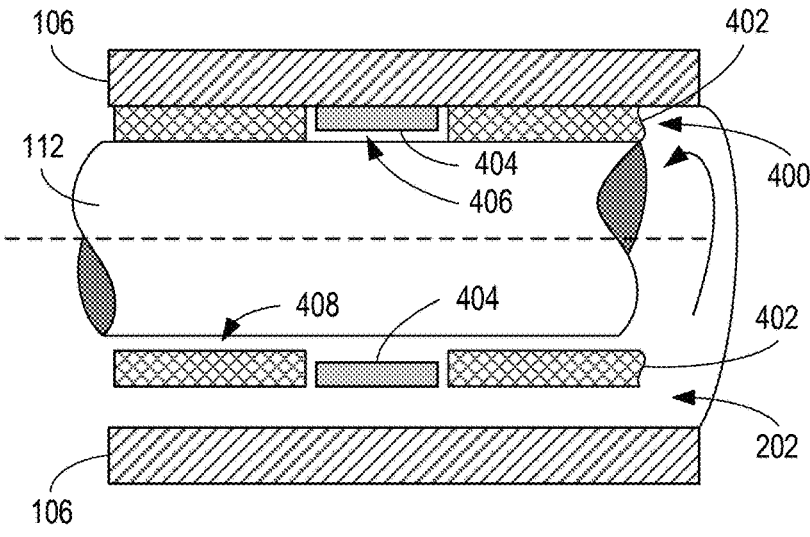
FIG. 4A is a side view of an example rotary bearing including a second example bearing wear indicator in a first wear state.
Figure 4B:
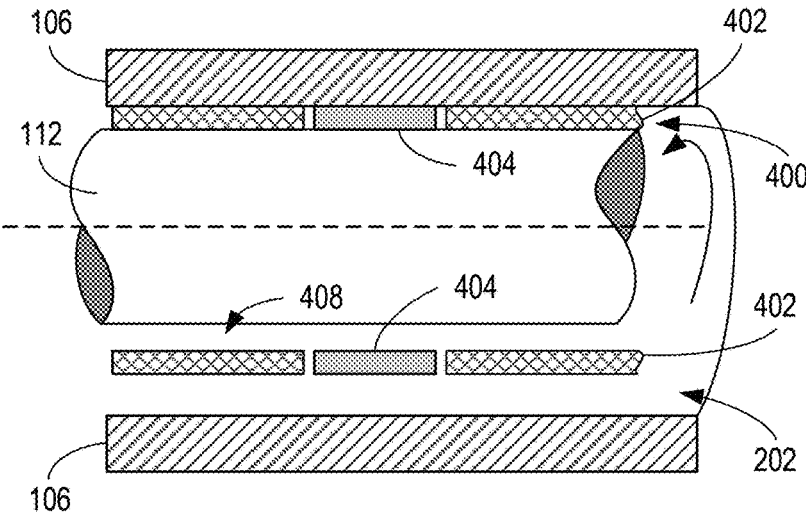
FIG. 4B is a side of the rotary bearing of FIG. $A with the bearing wear indicator in a second wear state.

FIG. 4A is a side view of an example rotary bearing 400 including a second example bearing wear indicator in a first wear state. FIG. 4B is a side view of the rotary bearing 400 with the bearing wear indicator in a second wear state. The bearing 400 includes a first layer 402 and a second layer 404. The first layer 402 forms a ring around the drive shaft 112. The second layer 404 also forms a ring around the drive shaft 112. In the illustrated example, the second layer 404 is within or between portions of the first layer 402. In other examples, the second layer 404 is positioned at an end of the first layer 402 (e.g., laterally to one side). The first layer 402 includes a polymer, and the second layer 404 includes a metal. The polymer and metal layers operate as disclosed above.

The first layer 402 has a first thickness, and the second layer 404 has a second thickness. The first thickness is greater than the second thickness. When the drive shaft 112 is loaded against the bearing 400 and against the first layer 402 in the position at the top of FIG. 4A, there is a gap 406 between the second layer 404 and the drive shaft 406 when the bearing 400 is in a first worn state. The loading of the drive shaft 112 also creates a second gap 408 at the opposite side of the drive shaft 112 (i.e., at the bottom of FIG. 4A).

As the bearing 400 wears, the thickness of the first layer 402 decreases, as shown in FIG. 4B. Eventually the thickness of the first layer 402 decreases to the thickness of the second layer 404. When the thickness of the first layer 402 decreases to the thickness of the second layer 404, the gap 406 is eliminated, and the second layer 404 makes contact with the drive shaft 112. The second layer 404 provides increased friction as the first layer 402 wears away. Because the coefficient of friction between the second layer 404 and the drive shaft 112 is greater than the coefficient of friction between the first layer 402 and the drive shaft 112, there is an increase in torque during rotation of the drive shaft 112 when the drive shaft 112 is in contact with the second layer 404. The torque profile can be sensed by the sensor 602 and analyzed by the wear determination circuitry 604 as disclosed above. Thus, contact between the second layer 404 and the drive shaft 112 is indicative of a worn bearing 400.

The second layer 404 forms a wear ring, and the thickness of the second layer 404 can be determined based on the thickness of the first layer 402 and/or based on the composition of the first layer 402. In some examples, the second layer 404 is pressed into the shaft bore 202.

Figure 5A:
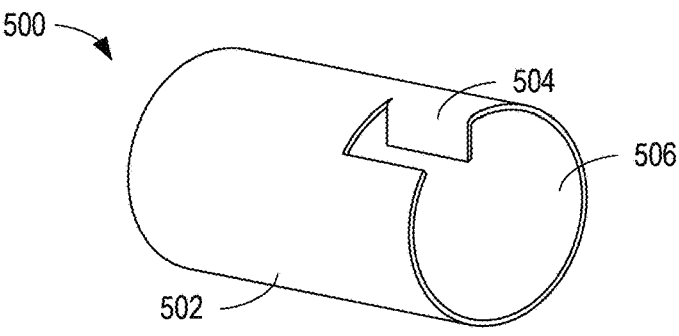
FIG. 5A is a perspective view a sleeve of a third example bearing wear indicator.
Figure 5B:
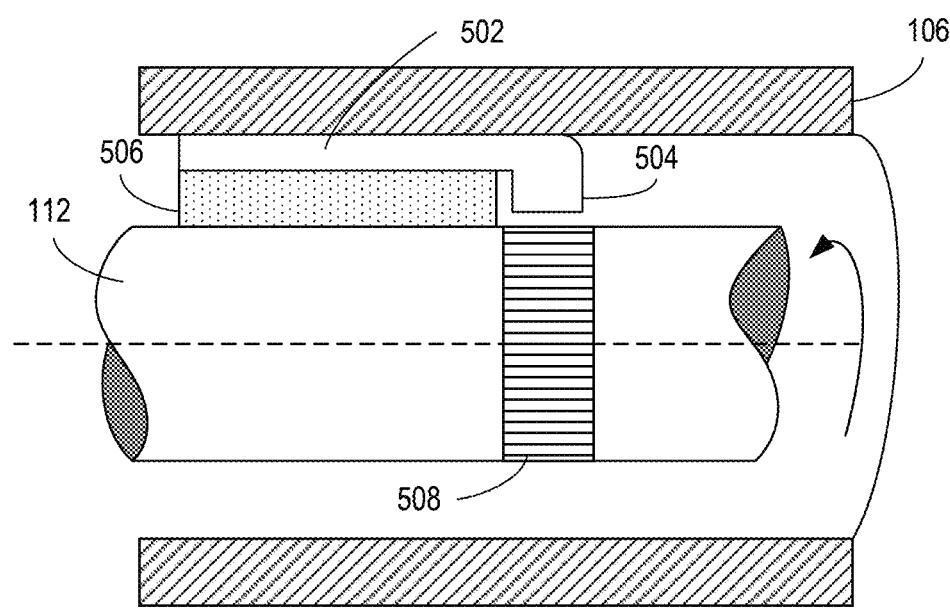
FIG. 5B is a side view of a portion the sleeve of FIG. 5A and an example drive shaft to form the third bearing wear indicator in a first wear state.
Figure 5C:
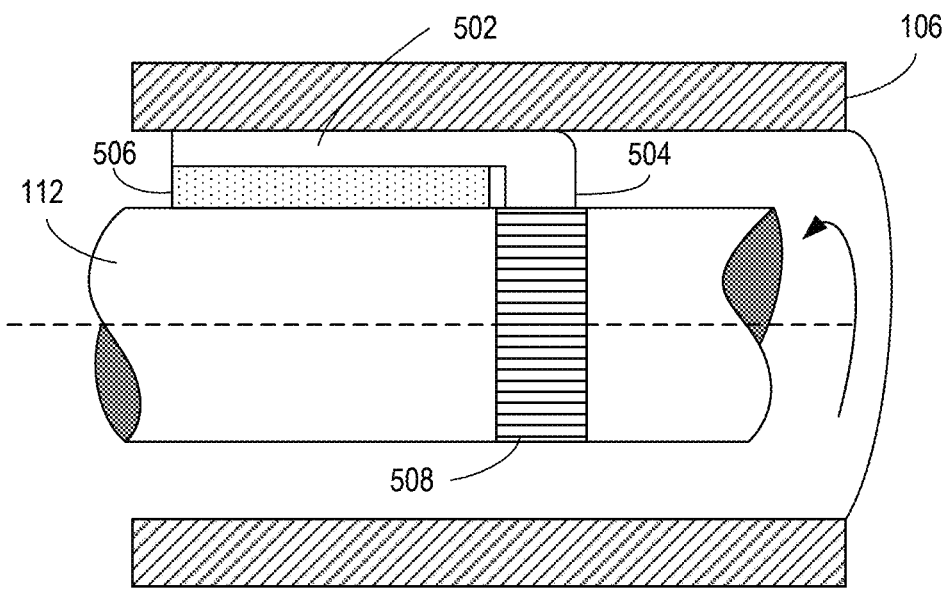
FIG. 5C is a side of the rotary bearing of FIG. 5B with the bearing wear indicator in a second wear state.
Figure 5D:
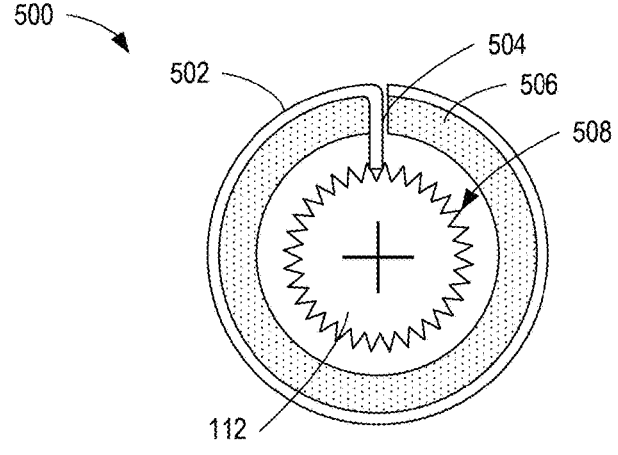
FIG. 5D is a cross sectional view of the assembled components of FIGS. 5A-C forming the third bearing wear indicator in the second wear state.

FIGS. 5A-5D illustrate another example bearing 500 that includes a bearing wear indicator. FIG. 5A is a perspective view an example outer sheath, jacket, or sleeve 502. The sleeve 502 includes an example extension, tab, or plate 504. The plate 504 is bent inward toward the interior diameter of the sleeve 502. The interior of the sleeve 502 is coupled to an example inner layer 506. As shown in FIGS. 5B and 5C, the inner layer 506 forms a first layer that engages the drive shaft 112, and the sleeve 502 forms a second layer. In some examples, the inner layer 506 includes a polymer and the sleeve 502 includes a metal. Thus, the inner layer 506 and the sleeve 502 operate as the first and second layers disclosed above. In some examples, the sleeve 502 may also include a polymer, but a polymer that is harder than the material of the inner layer 506.

The plate 504 extends through the inner layer 506. The plate 504 is aligned with knurls, grooves, or teeth 508 that are positioned axially around the drive shaft 112. In some examples, the teeth 508 form a ring around the drive shaft. 112. In a first wear state as shown in FIG. 5B, the inner layer 506 has a first thickness and the plate 504 is positioned away from the teeth 508. As the bearing 500 wears, the thickness of the inner layer 506 reduces, and the plate 504 moves closer to the teeth 508. Eventually, after enough wear and as shown in FIG. 5C, the thickness of the inner layer 506 is reduced to the point that the plate 504 contacts the teeth 508. In some examples, contact between the plate 504 and the teeth 508 increases the torque produced as the drive shaft 112 rotates. The torque profile can be sensed by the sensor 602 and analyzed by the wear determination circuitry 604 as disclosed above. Thus, contact between the plate 504 and the teeth 508 is indicative of a worn bearing 400.

In some examples, contact between the plate 504 and the teeth 508 creates vibration. The sensor 602 may include an accelerometer that senses the vibration. The wear determination circuitry 604 compares the vibration measured by the sensor 602 during rotation of the drive shaft 112 with a threshold value. If the vibration value meets, exceeds, or otherwise satisfies the threshold value (e.g., the measured vibration is greater than the threshold value), the wear determination circuitry 604 diagnoses or determines that the bearing 500 has worn and needs maintenance, repair, and/or replacement. In other words, the wear determination circuitry 604 monitors the vibration profile and assess a wear point or wear state of the bearing 500 based on the vibration profile. A change in vibration is indicative of a change in the inner layer 506 from the first thickness to the thinner second thickness, where portions of the inner layer 506 have worn away.

In some examples, contact between the plate 504 and the teeth 508 creates a tone or sound. In some examples, the sound is a ratcheting effect created by the plate 504 engaging the teeth 508. The sensor 602 may include a microphone that senses the sound including, for example, ultrasonic sounds. The wear determination circuitry 604 compares the sound measured by the sensor 602 during rotation of the drive shaft 112 with a threshold value. If the sound value (e.g., decibel value) meets, exceeds, or otherwise satisfies the threshold value (e.g., the measured sound is greater than the threshold value), the wear determination circuitry 604 diagnoses or determines that the bearing 500 has worn and needs maintenance, repair, and/or replacement. In other words, the wear determination circuitry 604 monitors the acoustic profile and assess a wear point or wear state of the bearing 500 based on the acoustic profile. A change in acoustics is indicative of a change in the inner layer 506 from the first thickness to the thinner second thickness, where portions of the inner layer 506 have worn away.

FIG. 6 is a block diagram of an example implementation of the wear determination circuitry 604 of FIG. 1 to determine wear of a bearing in a valve system. The wear determination circuitry 604 of FIG. 6 may be instantiated (e.g., creating an instance of, bring into being for any length of time, materialize, implement, etc.) by programmable circuitry such as a Central Processor Unit (CPU) executing first instructions. Additionally or alternatively, the wear determination circuitry 604 of FIG. 6 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 6 may, thus, be instantiated at the same or different times. Some or all of the circuitry of FIG. 6 may be instantiated, for example, in one or more threads executing concurrently on hardware and/or in series on hardware. Moreover, in some examples, some or all of the circuitry of FIG. 6 may be implemented by microprocessor circuitry executing instructions and/or FPGA circuitry performing operations to implement one or more virtual machines and/or containers.

Figure 7:
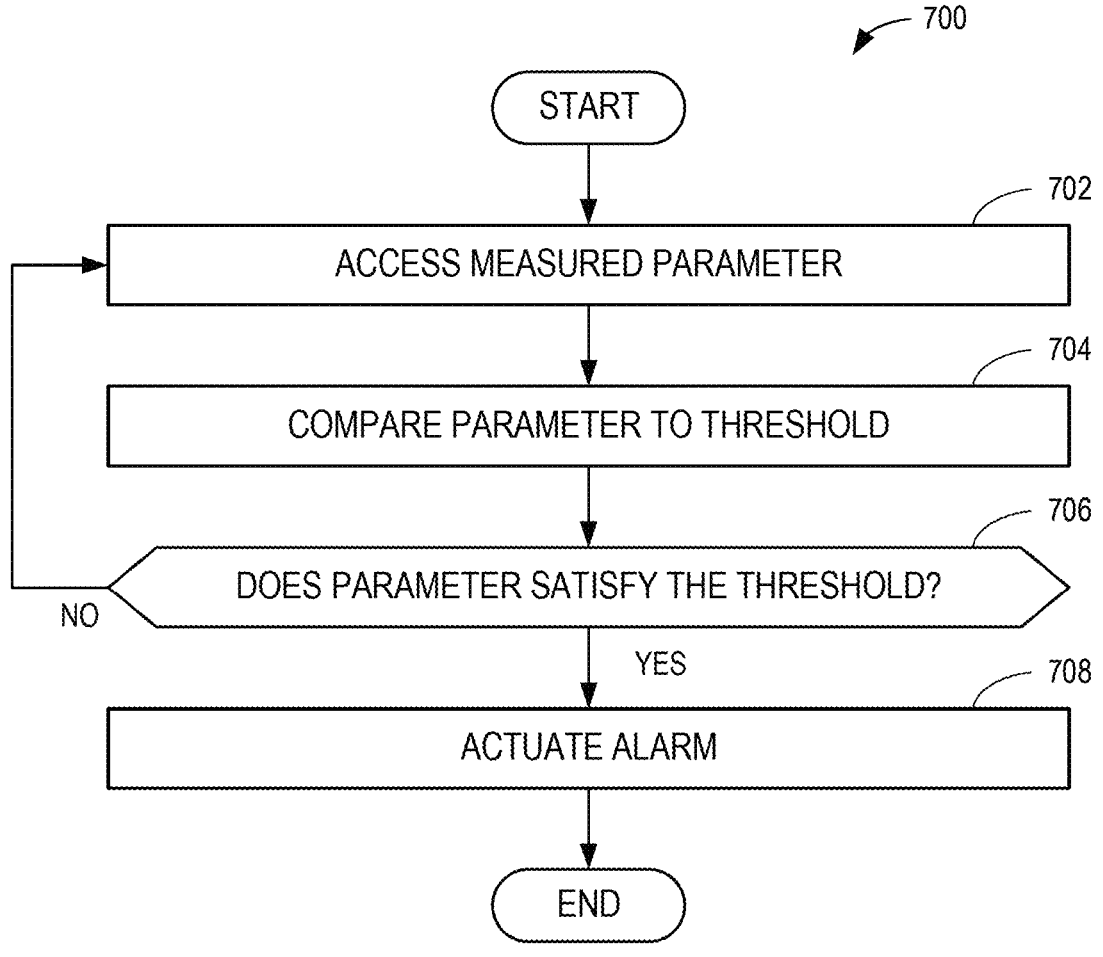
FIG. 7 is a flowchart representative of example machine readable instructions and/or example operations that may be executed, instantiated, and/or performed by example programmable circuitry to implement the wear determination circuitry of FIG. 6.

In some examples, the wear determination circuitry 604 is instantiated by programmable circuitry executing wear determination instructions and/or configured to perform operations such as those represented by the flowchart(s) of FIG. 7.

In some examples, the wear determination circuitry 604 includes means for determining a condition of a device. In some examples, the wear determination circuitry 604 may be instantiated by programmable circuitry such as the example programmable circuitry 812 of FIG. 8 executing machine executable instructions such as those implemented by at least blocks 702, 704 of FIG. 7. In some examples, wear determination circuitry 604 may be instantiated by hardware logic circuitry, which may be implemented by an ASIC, XPU, or FPGA circuitry configured and/or structured to perform operations corresponding to the machine readable instructions. Additionally or alternatively, the wear determination circuitry 604 may be instantiated by any other combination of hardware, software, and/or firmware. For example, the wear determination circuitry 604 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the wear determination circuitry 604 of FIG. 1 is illustrated in FIG. 6, one or more of the elements, processes, and/or devices illustrated in FIG. 6 may be combined, divided, re-arranged, omitted, eliminated, and/or implemented in any other way. Further, the example wear determination circuitry 604 of FIG. 6, may be implemented by hardware alone or by hardware in combination with software and/or firmware. Thus, for example, the example wear determination circuitry 604, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example wear determination circuitry 604 of FIG. 6 may include one or more elements, processes, and/or devices in addition to, or instead of, those illustrated in FIG. 6, and/or may include more than one of any or all of the illustrated elements, processes and devices.

Flowchart(s) representative of example machine readable instructions, which may be executed by programmable circuitry to implement and/or instantiate the wear determination circuitry 604 of FIG. 6 and/or representative of example operations which may be performed by programmable circuitry to implement and/or instantiate the wear determination circuitry 604 of FIG. 6, are shown in FIG. 7. The machine readable instructions may be one or more executable programs or portion(s) of one or more executable programs for execution by programmable circuitry such as the programmable circuitry 812 shown in the example processor platform 800 discussed below in connection with FIG. 8 and/or may be one or more function(s) or portion(s) of functions to be performed by the example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 7, many other methods of implementing the example wear determination circuitry 604 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 7 is a flowchart representative of example machine readable instructions and/or example operations 700 that may be executed, instantiated, and/or performed by programmable circuitry to determine wear of a bearing. The example machine-readable instructions and/or the example operations 700 of FIG. 7 include the wear determination circuitry 604 accessing a measured parameter (block 702). The measured parameter may be, for example, a force, a torque, a vibration, or a sound. The wear determination circuitry 604 compares the parameter to a threshold (block 704). The wear determination circuitry 604 determines if the parameter satisfies the threshold (block 706). If and/or when the wear determination circuitry 604 determines that the parameter does not satisfy the threshold (block 706: NO), the process 700 continues with the wear determination circuitry 604 accessing the measured parameters later in time (block 702). If and/or when the wear determination circuitry 604 determines that the parameter does satisfy the threshold (block 706: YES), the wear determination circuitry 604 causes actuation of an alarm or other notification indicating that the bearing needs maintenance (block 708).

Figure 8:
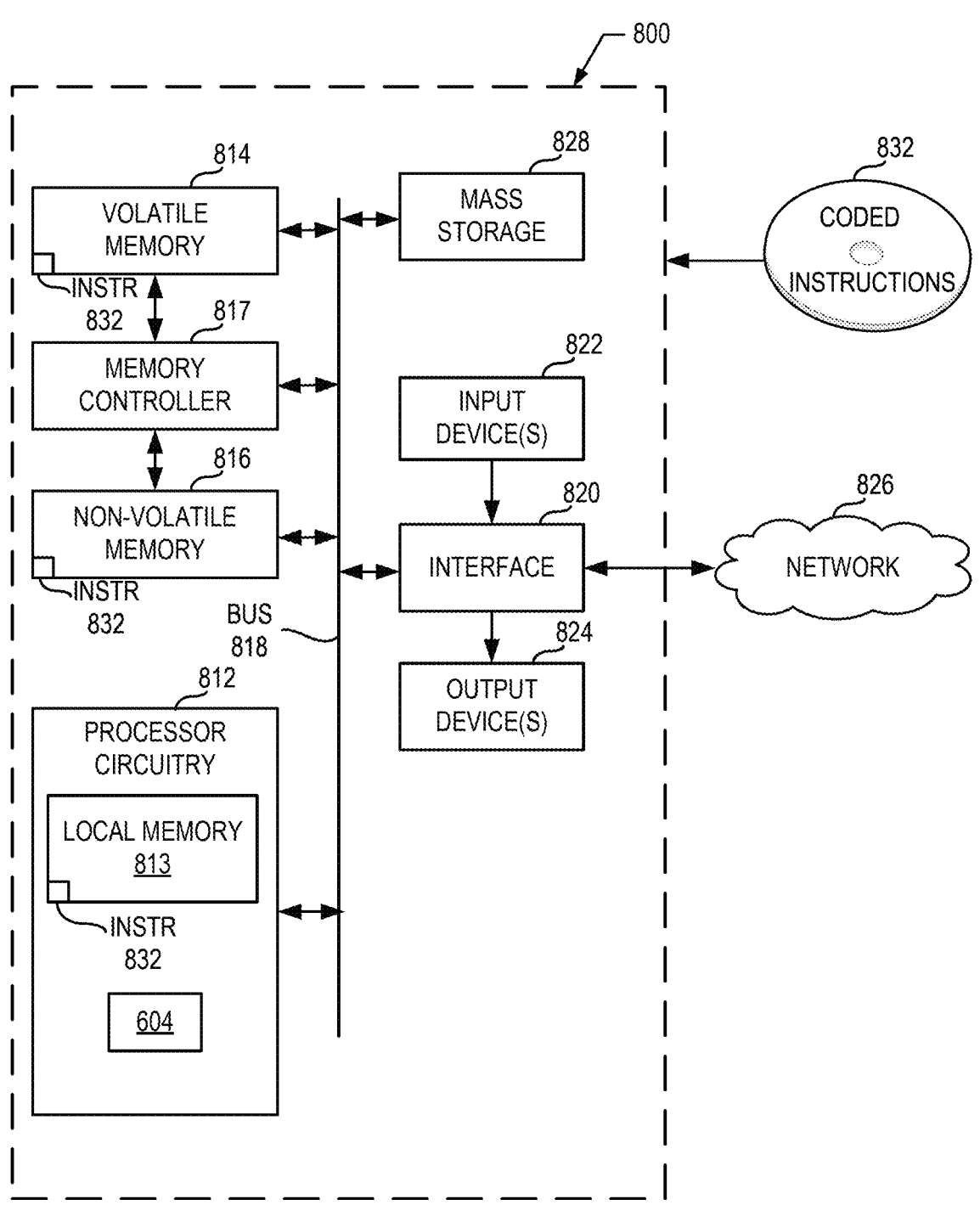
FIG. 8 is a block diagram of an example processing platform including programmable circuitry structured to execute, instantiate, and/or perform the example machine readable instructions and/or perform the example operations of FIG. 7 to implement the wear determination circuitry of FIG. 6.

FIG. 8 is a block diagram of an example programmable circuitry platform 800 structured to execute and/or instantiate the example machine-readable instructions and/or the example operations of FIG. 7 to implement the wear determination circuitry 604 of FIG. 6. The programmable circuitry platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing and/or electronic device.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/ or microcontrollers from any desired family or manufacturer. The programmable circuitry 812 may be implemented by one or more semiconductor based (e.g., silicon based) devices. In this example, the programmable circuitry 812 implements the wear determination circuitry 604.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. The input device(s) 822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data.

Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 832, which may be implemented by the machine readable instructions of FIG. 7, may be stored in the mass storage device 828, in the volatile memory 814, in the non-volatile memory 816, and/or on at least one non-transitory computer readable storage medium such as a CD or DVD which may be removable.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

From the foregoing, it will be appreciated that example systems, apparatus, articles of manufacture, and methods have been disclosed that monitor wears states of bearings in control valve systems to assess, determine, and/or predict maintenance needs of the bearings. Examples disclosed herein use multiple layers of different materials. As one of the layers wears, different metrics or parameters such as, for example, force, torque, vibration, and/or sounds are detectable. The profile of these metrics can be used to assess the wear state of the bearing and create notification indicative of the wear state. Examples disclosed herein also may be used to assess wear states of packing used to seal valves.

Example systems, apparatus, articles of manufacture, and methods for rotary bearing maintenance are disclosed. Example 1 includes an apparatus that includes a valve body defining a fluid passageway; a flow control member in the fluid passageway; a drive shaft coupled to the flow control member, the drive shaft extending through a shaft bore defined in the valve body; and a bearing around at least a portion of the drive shaft. The bearing of Example 1 includes: a first layer including a first material having a first coefficient of friction with the drive shaft when the first material is in contact with the drive shaft; and a second layer including a second material having a second coefficient of friction with the drive shaft when the second material is in contact with the drive shaft, the second coefficient of friction greater than the first coefficient of friction.

Example 2 includes the apparatus of Example 1, wherein the first layer is at an inner diameter of the bearing and the second layer is at an outer diameter of the bearing.

Example 3 includes the apparatus of any of Examples 1-2, wherein the first layer includes a polymer and the second layer includes a metal.

Example 4 includes the apparatus of any of Examples 1-3, wherein the first layer and the second layer are coupled via finger joints.

Example 5 includes the apparatus of any of Examples 1-4, wherein the first layer has a first thickness when the bearing is in a first wear state and a second thickness when the bearing is in a second wear state.

Example 6 includes the apparatus of Example 5, further including a sensor to detect a change in torque during movement of the drive shaft, the change in torque indicative of a change in the first layer from the first thickness to the second thickness.

Example 7 includes the apparatus of any of Examples 1-6, further including: a sensor to detect a change in torque during movement of the drive shaft; and programmable circuitry to determine when the change in torque satisfies a threshold change in torque.

Example 8 includes the apparatus of Example 7, wherein the programmable circuitry is to trigger a notification when the change in torque satisfies the threshold change in torque.

Example 9 includes the apparatus of any of Examples 1-8, wherein the first layer includes a first ring having a first thickness and the second layer includes a second ring having a second thickness, the first thickness greater than the second thickness.

Example 10 includes the apparatus of Example 9, wherein the first ring contacts the drive shaft when the bearing is in a first wear state, wherein there is a gap between the second ring and the drive shaft when the bearing is in the first wear state, and wherein the first ring and the second ring contact the drive shaft when the bearing is in a second wear state.

Example 11 includes the apparatus of Example 10, wherein the first ring has a thickness between the first thickness and the second thickness when the bearing is in the first wear state, and the first ring has the second thickness when the bearing is in the second wear state.

Example 12 includes the apparatus of any of Examples 1-11, wherein the second layer includes: a sleeve around the first layer; and a plate extending from the sleeve through the first layer.

Example 13 includes the apparatus of Example 12, wherein the first layer has a first thickness when the bearing is in a first wear state, wherein the plate is separated from the drive shaft when the bearing is in the first wear state, wherein the first layer has a second thickness less than the first thickness when the bearing is a second wear state, and wherein the plate engages the drive shaft when the bearing is in the second wear state.

Example 14 includes the apparatus of any of Examples 12-13, wherein the drive shaft includes a plurality of teeth, the plate to engage the teeth when the bearing is in a worn state.

Example 15 includes the apparatus of Example 14, further including a sensor to detect when the plate is in engagement with the teeth.

Example 16 includes the apparatus of Example 15, wherein the sensor includes a microphone.

Example 17 includes the apparatus of any of Examples 14-16, wherein the teeth form a ring around the drive shaft.

Example 18 includes a bearing for a drive shaft in a valve, the bearing including: a first layer including a first material having a first coefficient of friction with the drive shaft when the first material is in contact with the drive shaft; and a second layer including a second material having a second coefficient of friction with the drive shaft when the second material is in contact with the drive shaft, the second coefficient of friction greater than the first coefficient of friction.

Example 19 includes the bearing of Example 18, wherein the first layer has a first thickness when the bearing is in a first wear state, wherein the first layer is to contact the drive shaft when the bearing is in a first wear state, wherein the first layer has a second thickness less than the first thickness when the bearing is in a second wear state, and wherein the first layer and the second layer are to contact the drive shaft when the bearing is in the second wear state.

Example 20 includes the bearing of Example 19, wherein the second layer includes: a sleeve around the first layer; and a plate extending from the sleeve through the first layer, wherein the first layer has a first thickness when the bearing is in a first wear state, wherein the plate is separated from the drive shaft when the bearing is in the first wear state, wherein the first layer has a second thickness less than the first thickness when the bearing is a second wear state, and wherein the plate engages the drive shaft when the bearing is in the second wear state.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
a valve body defining a fluid passageway;
a flow control member in the fluid passageway;
a drive shaft coupled to the flow control member, the drive shaft extending through a shaft bore defined in the valve body;
a bearing around at least a portion of the drive shaft, the bearing including:
a first layer including a first material having a first coefficient of friction with the drive shaft when the first material is in contact with the drive shaft; and
a second layer including a second material having a second coefficient of friction with the drive shaft when the second material is in contact with the drive shaft, the second coefficient of friction greater than the first coefficient of friction, wherein the first layer has a first thickness when the bearing is in a first wear state and a second thickness when the bearing is in a second wear state; and
a sensor to detect a change in torque during movement of the drive shaft, the change in torque indicative of a change in the first layer from the first thickness to the second thickness.

2. The apparatus of claim 1, wherein the first layer is at an inner diameter of the bearing and the second layer is at an outer diameter of the bearing.

3. The apparatus of claim 1, wherein the first layer includes a polymer and the second layer includes a metal.

4. The apparatus of claim 1, wherein the first layer includes a first ring having a first thickness and the second layer includes a second ring having a second thickness, the first thickness greater than the second thickness.

5. The apparatus of claim 4, wherein the first ring contacts the drive shaft when the bearing is in a first wear state, wherein there is a gap between the second ring and the drive shaft when the bearing is in the first wear state, and wherein the first ring and the second ring contact the drive shaft when the bearing is in a second wear state.

6. The apparatus of claim 5, wherein the first ring has a thickness between the first thickness and the second thickness when the bearing is in the first wear state, and the first ring has the second thickness when the bearing is in the second wear state.

7. The apparatus of claim 1, wherein the second layer includes:
a sleeve around the first layer; and
a plate extending from the sleeve through the first layer.

8. The apparatus of claim 7, wherein the plate is separated from the drive shaft when the bearing is in the first wear state, and wherein the plate engages the drive shaft when the bearing is in the second wear state.

9. The apparatus of claim 7, wherein the drive shaft includes a plurality of teeth, the plate to engage the teeth when the bearing is in a worn state.

10. The apparatus of claim 9, wherein the sensor is to detect when the plate is in engagement with the teeth.

11. The apparatus of claim 10, wherein the sensor includes a microphone.

12. The apparatus of claim 9, wherein the teeth form a ring around the drive shaft.

13. An apparatus comprising:

a bearing for a drive shaft in a valve, the bearing including:

a first layer including a first material having a first coefficient of friction with the drive shaft when the first material is in contact with the drive shaft; and a second layer including a second material having a second coefficient of friction with the drive shaft when the second material is in contact with the drive shaft, the second coefficient of friction greater than the first coefficient of friction, wherein the first layer and the second layer are coupled via finger joints.

14. The apparatus of claim 13, further including:

a valve body defining a fluid passageway;

a flow control member in the fluid passageway; and the drive shaft, wherein the draft shaft is coupled to the flow control member, the drive shaft extending through a shaft bore defined in the valve body, and wherein the bearing is around at least a portion of the drive shaft.

15. The apparatus of claim 13, wherein the first layer has a first thickness when the bearing is in a first wear state and a second thickness when the bearing is in a second wear state.

16. The apparatus of claim 15, further including a sensor to detect a change in torque during movement of the drive shaft, the change in torque indicative of a change in the first layer from the first thickness to the second thickness.

17. The apparatus of claim 13, wherein the first layer has a first thickness when the bearing is in a first wear state, wherein the first layer is to contact the drive shaft when the bearing is in a first wear state, wherein the first layer has a second thickness less than the first thickness when the bearing is in a second wear state, and wherein the first layer and the second layer are to contact the drive shaft when the bearing is in the second wear state.

18. An apparatus comprising:

a valve body defining a fluid passageway;

a flow control member in the fluid passageway;

a drive shaft coupled to the flow control member, the drive shaft extending through a shaft bore defined in the valve body;

a bearing around at least a portion of the drive shaft, the bearing including:

a first layer including a first material having a first coefficient of friction with the drive shaft when the first material is in contact with the drive shaft; and a second layer including a second material having a second coefficient of friction with the drive shaft when the second material is in contact with the drive shaft, the second coefficient of friction greater than the first coefficient of friction;

a sensor to detect a change in torque during movement of the drive shaft; and programmable circuitry to determine when the change in torque satisfies a threshold change in torque.

19. The apparatus of claim 18, wherein the programmable circuitry is to trigger a notification when the change in torque satisfies the threshold change in torque.

* * * * *